United States Patent
Jeon et al.

(10) Patent No.: US 8,623,536 B2
(45) Date of Patent: Jan. 7, 2014

(54) BATTERY MODULE WITH PARTITIONING WALL THEREIN

(75) Inventors: Yoon-Cheol Jeon, Suwon-si (KR); Tae-Yong Kim, Suwon-si (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 1329 days.

(21) Appl. No.: 11/598,625

(22) Filed: Nov. 14, 2006

(65) Prior Publication Data
US 2007/0133151 A1 Jun. 14, 2007

Related U.S. Application Data

(63) Continuation-in-part of application No. 11/256,343, filed on Oct. 20, 2005, now Pat. No. 7,989,104.

(30) Foreign Application Priority Data

Nov. 15, 2005 (KR) .................. 10-2005-0108972

(51) Int. Cl.
*H01M 10/50* (2006.01)
*H01M 2/10* (2006.01)

(52) U.S. Cl.
USPC .................. 429/120; 429/156; 429/71

(58) Field of Classification Search
USPC .................. 429/148–160, 71, 120, 122
See application file for complete search history.

(56) References Cited

U.S. PATENT DOCUMENTS

| | | | | |
|---|---|---|---|---|
| 3,664,877 A | * | 5/1972 | Shaw | 429/99 |
| 5,756,227 A | * | 5/1998 | Suzuki et al. | 429/62 |
| 6,130,003 A | * | 10/2000 | Etoh et al. | 429/99 |
| 6,569,561 B1 | * | 5/2003 | Kimura et al. | 429/159 |
| 6,613,472 B1 | * | 9/2003 | Watanabe | 429/120 |
| 2006/0093899 A1 | * | 5/2006 | Jeon et al. | 429/99 |

FOREIGN PATENT DOCUMENTS

| | | | | | |
|---|---|---|---|---|---|
| JP | S50-145427 U | * | 12/1975 | | H01M 2/10 |
| JP | 08-321329 A | * | 12/1996 | | H01M 10/50 |
| JP | 2003007355 A | * | 1/2003 | | H01M 10/50 |
| KR | 10-2005-0108972 A | | 11/2005 | | |

OTHER PUBLICATIONS

Machine translation for Takahashi et al., JP 2003-007355 A.*

* cited by examiner

*Primary Examiner* — Edu E Enin-Okut
(74) *Attorney, Agent, or Firm* — Lee & Morse, P.C.

(57) ABSTRACT

A battery module, including at least one unit battery having an electrode group and a battery casing, and at least one partitioning wall coupled to the at least one unit battery, wherein the at least one partitioning wall has a smaller size as compared to the at least one unit battery. The battery module may further include a plurality of alternating unit batteries and partitioning walls having at least one fixing member coupled to each unit battery.

18 Claims, 8 Drawing Sheets

BATTERY MODULE WITH PARTITIONING WALL THEREIN

CROSS REFERENCE TO RELATED APPLICATION

The present application is a continuation-in-part application of co-pending U.S. patent application Ser. No. 11/256,343, filed on Oct. 20, 2005, the entire contents of which is hereby incorporated by reference in its entirety.

BACKGROUND OF THE INVENTION

1. Field of the Invention

The present invention relates to a battery module having a plurality of unit batteries. In particular, the present invention relates to a battery module having improved structure of partitioning walls between its unit batteries to provide enhanced battery durability and efficiency.

2. Description of the Related Art

In general, a secondary battery, i.e., a unit battery, may be a type of a rechargeable battery, as opposed to a primary battery that cannot be recharged. A low capacity secondary battery may include a single battery cell to supply power to a portable electronic device, such as mobile phones, laptop computers, and camcorders. A high capacity secondary battery may include a plurality of battery cells, i.e., battery module, to supply power to electrical motors, such as a motor of a hybrid vehicle.

A conventional battery module may include a plurality of unit cell batteries, wherein each unit battery may include an electrode group, a separator positioned between positive and negative electrodes in the electrode group, positive and negative terminals connected to charge collectors, and a casing with a cap to store the batteries and electrodes therein. The casing may usually be formed to have predetermined intervals between the unit batteries, such that partitioning walls may be interposed therein.

A conventional battery module may also include end plates at the outermost ends thereof. The end plates may be pressed towards each other with the unit batteries therebetween in order to reduce the thickness of the electrode groups of the unit batteries and, thereby, improve the efficiency, i.e., charging/discharging, of the battery units.

However, when the end plates are pressed to reduce the thickness of the electrode groups, the conventional structure of the partitioning walls may prevent sufficient compression. In particular, the conventional partitioning walls may be structured such that their edges may be in contact with the casing of the battery module, thereby minimizing the amount of inward compression the surface of the casing may undergo. Such minimized inward compression may result either in insufficient thickness reduction of the electrode group, i.e., reduced shifting distance of ions, or in excessive force, thereby subjecting the unit batteries to potential deformation and damage.

Therefore, there exists a need for a battery module having an improved partitioning wall structure providing enhanced battery durability and efficiency.

SUMMARY OF THE INVENTION

The present invention is therefore directed towards a battery module, which substantially overcomes one or more of the problems due to the limitations and disadvantages of the related art.

It is therefore a feature of an embodiment of the present invention to provide a battery module having an improved partitioning wall structure providing enhanced charging/discharging efficiency.

It is therefore another feature of the present invention to provide a battery module having an improved partitioning wall structure capable of providing enhanced durability.

At least one of the above and other features and advantages of the present invention may be realized by providing a battery module, including at least one unit battery having an electrode group and a battery casing, and at least one partitioning wall coupled to the at least one unit battery, wherein the at least one partitioning wall may have a smaller size as compared to the at least one unit battery. The size of the at least one partitioning wall may be equal to a size of the electrode group of the at least one unit battery. Further, a center of the at least one partitioning wall may be attached to a center of the battery casing of the at least one unit battery.

The battery module according to an embodiment of the present invention may further include a plurality of unit batteries and a plurality of partitioning walls interposed in an alternating array. Additionally, each partitioning wall may include a plurality of protrusions.

Further, at least one fixing member may be coupled to each battery unit. As such, each partitioning wall may be positioned between at least two fixing members. The at least one fixing member may be formed of an elastic material. Additionally, the battery module may include a housing having a space for a cooling fluid, wherein the at least one fixing member may be positioned in a direction parallel to a direction of flow of the cooling fluid.

The at least one fixing member may have a semicircular shape. Alternatively, the at least one fixing member may have a longitudinal shape, wherein the at least one fixing member may have a width that is larger than the width of the protrusions of the partitioning walls. The at least one fixing member may also have a rectangular protrusion shape, wherein it may have a width that is equal to or smaller than the width of the protrusions of the partitioning walls. Additionally, such a battery module may include a plurality of rectangular-shaped fixing member integrated with the battery casing of the unit battery.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Korean Patent Application No. 10-2005-0108972 filed on Nov. 15, 2005, in the Korean Intellectual Property Office, and entitled: "Secondary Battery Module," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element or substrate, it can be directly on the other element or substrate, or intervening elements may also be present. Further, it will be understood that when an element is referred to as being "under" another element, it can be directly under, or one or more intervening elements may also be present. In addition, it will also be understood that when an element is referred to as being "between" two elements, it can be the only layer between the two elements, or one or more intervening elements may also be present. Like reference numerals refer to like elements throughout.

Figure 1:
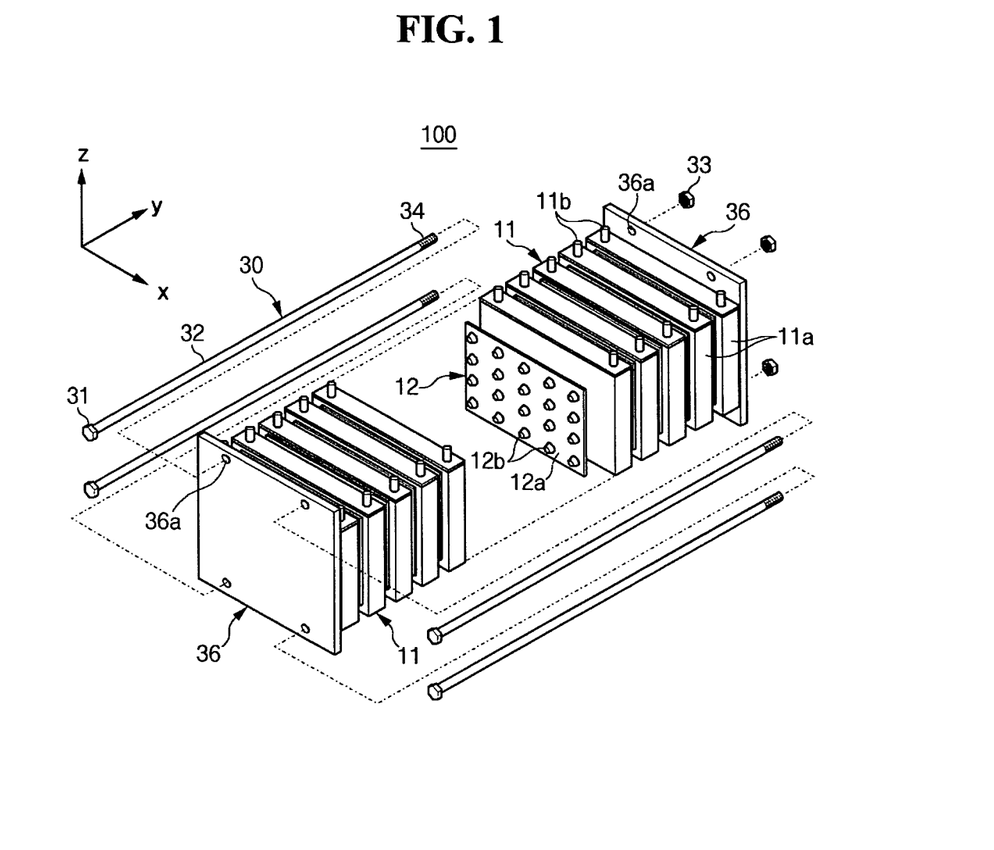
FIG. 1 illustrates an exploded perspective view of a battery module according to an embodiment of the present invention.
Figure 2:
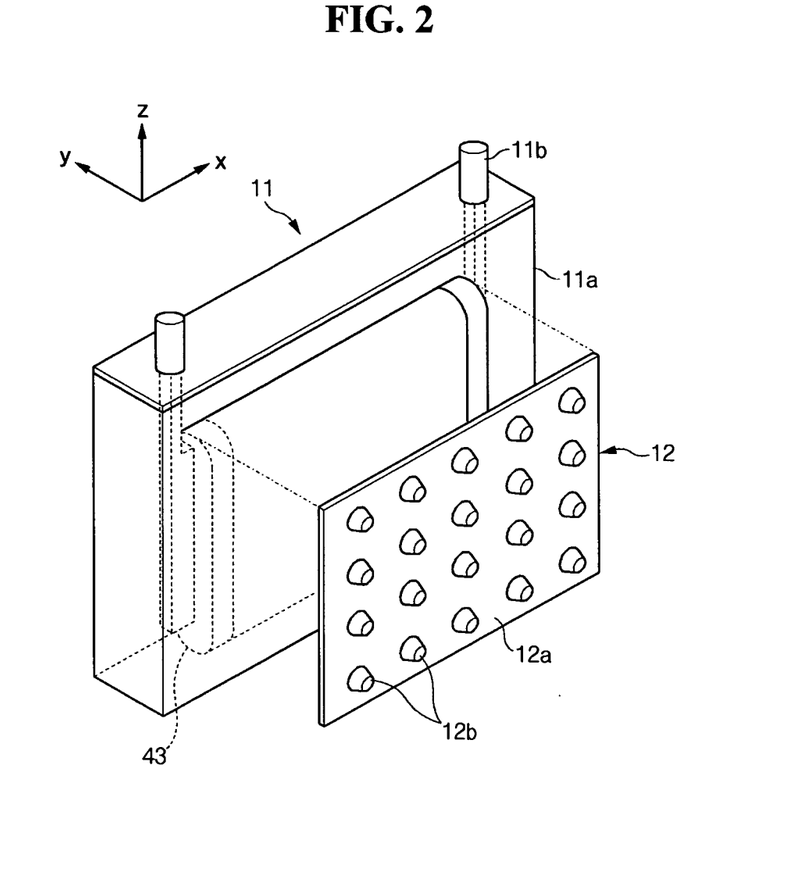
FIG. 2 illustrates an exploded perspective view of a unit battery and a partitioning wall of the battery module illustrated in FIG. 1.
Figure 3:
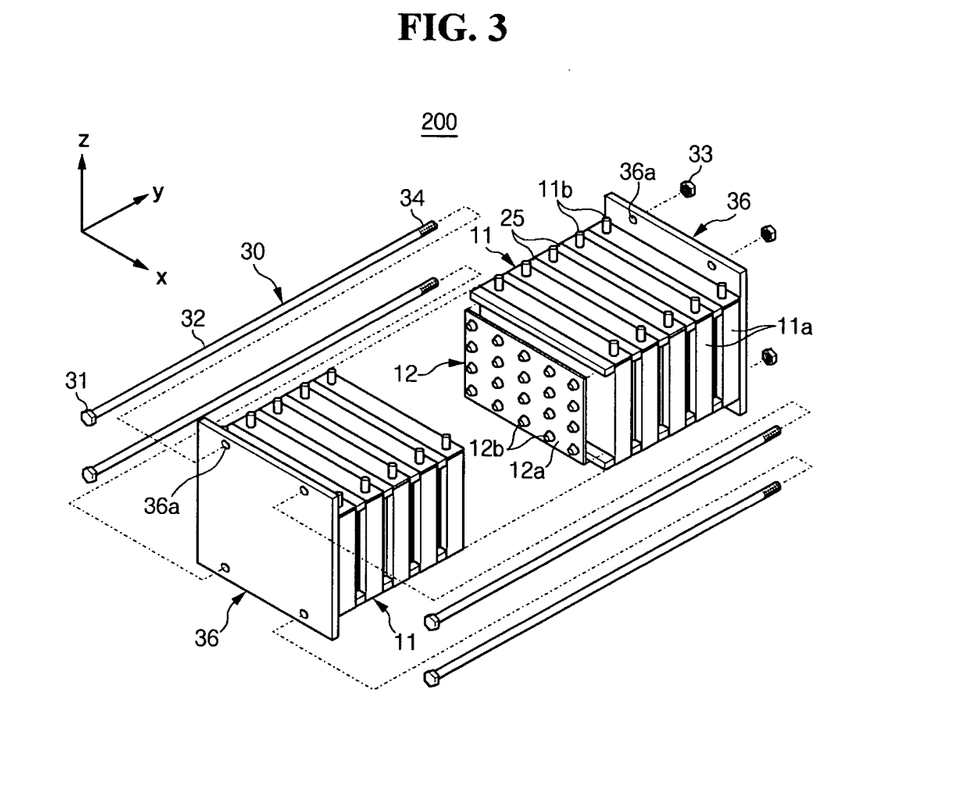
FIG. 3 illustrates an exploded perspective view of a battery module according to another embodiment of the present invention.

An exemplary embodiment of a battery module according to the present invention is more fully described below with reference to FIGS. 1-2. As illustrated in FIGS. 1-2, a battery module 100 according to an embodiment of the present invention may include a plurality of unit batteries 11, a plurality of partitioning walls 12 interposed between the unit batteries 11 to provide a path for a cooling fluid, and end plates 36 for supporting the unit batteries 11.

The unit batteries 11 of the battery module 100 according to an embodiment of the present invention may be in any shape known in the art, e.g., cylindrical, circular, rectangular, and so forth. In this respect, it should be noted that even though the unit batteries 11 are illustrated to have a rectangular shape, other potential shapes are not excluded from the scope of the present invention.

Each unit battery 11 may include an electrode group 43, separators (not shown) interposed between the positive and negative electrodes of the electrode group 43, a battery casing 11a forming an outer shell for battery cell components, e.g., electrode group 43, and so forth, and electrode terminals 11b. The electrode group 43 may provide, i.e., charge or discharge, a predetermined amount of electricity to the unit battery 11. The electrode terminals 11b may be formed on an outside surface of the battery casing 11a, such that they may protrude outwardly from the battery casing 11a.

The partitioning walls 12 of the battery module 100 according to an embodiment of the present invention may be formed between the unit batteries 11. In particular, each partitioning wall 12 may be positioned between two adjacent unit batteries 11 to form an alternating array of unit batteries 11 and partitioning walls 12. In other words, each partitioning wall 12 may be coupled to one unit battery 11 to form a single array unit. A plurality of such single array units may be assembled into an alternating array, such that each partitioning wall 12 may have a parallel unit battery 11 at each side.

Each partitioning wall 12 may provide a medium for a cooling fluid between the unit batteries 11, such that sufficient temperature control, i.e., cooling, of the unit batteries 11 may be supplied.

The partitioning wall 12 may include a base 12a and a plurality of protrusions 12b. The base 12a may be formed in any shape known in the art to facilitate construction of the partitioning wall 12, e.g., a rectangular plate. The plurality of protrusions 12b may be formed in the base 12a in a direction perpendicular to the plane of the base 12a, and they may be uniformly disposed thereon, i.e., having uniform and predetermined intervals therebetween.

The size of the partitioning wall 12 may be smaller than the size of the unit battery 11. In particular, the length and height of the base 12a of the partitioning wall 12, as measured along the x-axis and z-axis, respectively, may be smaller than the length and height, respectively, of the battery casing 11a of the unit battery 11. As such, the edges of the partitioning walls 12 may not be in contact with the battery casing 11a due to their shorter length. For example, the size of the partitioning wall 12 may be substantially equal to the size of the electrode group 43 in the unit battery 11, i.e., have the same length and height, as illustrated in FIG. 2.

The partitioning wall 12 may be attached to the unit battery 11 such that the center of the base 12a may be affixed to the center of the battery casing 11a. Without intending to be bound by theory, it is believed that such attachment may be advantageous because any force exerted by the partitioning walls 12 onto the unit batteries 11 may be directed towards the center of the unit batteries 11, thereby eliminating pressure from the edges of the unit batteries 11 and minimizing the overall force applied thereto by the end plates 36 as will be discussed in more detail below.

The pair of end plates 36 of the battery module 100 according to an embodiment of the present invention may be formed at the two outermost ends of the battery module 100, such that the plurality of unit batteries 11 and partitioning walls 12, i.e., alternating array, may be positioned therebetween. The pair of end plates 36 may be connected to support the alternating array therebetween. In particular, each one of the end plates 36 may have a thru-hole 36a at each of its corners to facilitate assembly of the battery module 100. More specifically, a connecting member 30 may be inserted into each thru-hole 36a of one end plate 36 and a corresponding thru-hole 36a of another end plate 36, as can be seen in FIG. 1, to form a supporting structure.

The connecting member 30 may include a bar portion 32 having a flange portion 31 at one end a thread 34 at another end, such that after the connecting member 30 is inserted through both end plates 36, a nut 33 may be connected to the thread 34 of the bar portion 32 of the connecting member 30 to secure connection thereof. The battery module 100 according to an embodiment of the present invention may include four connecting members 30, such that the battery module 100 may be secured along four sides simultaneously to form a supporting structure.

Securing four nuts 33 to the four connecting members 30 may provide sufficient force to push the pair of end plates 36 together and, thereby, compress the plurality of the unit batteries 11 and plurality of partitioning walls 12 together as well. Such compression may minimize the distance between the plurality of the unit batteries 11 and plurality of partitioning walls 12, thereby improving the battery efficiency.

In another embodiment of a battery module according to the present invention, as illustrated in FIGS. 3-6, a battery module 200 may include a plurality of unit batteries 11, a plurality of partitioning walls 12 interposed between the unit batteries 11 to provide a path for a cooling fluid, end plates 36 for supporting the unit batteries 11, and a plurality of fixing members 25.

It is noted that some of the particular elements included in the embodiment illustrated in FIGS. 3-6 are the same elements described previously with respect to FIGS. 1-2. Accordingly, only elements and details that may be distinguishable from the previous embodiment will be described hereinafter. Details and descriptions that may be found in both embodiments illustrated in FIGS. 1-6 will not be repeated herein.

The fixing members 25 of the battery module 200 according to an embodiment of the present invention may have a longitudinal shape, e.g., rectangular bar, circular bar, triangular bar, and so forth, and they may be installed lengthwise in each of the upper and lower ends of the unit battery 11 by any way known in the art, e.g., adhesive, to support the partitioning wall 12, as shown in FIGS. 3-6. In particular, the fixing members 25 may be attached in parallel to the partitioning walls 12, such that each partitioning wall 12 may be positioned between two fixing members 25.

Figure 5:
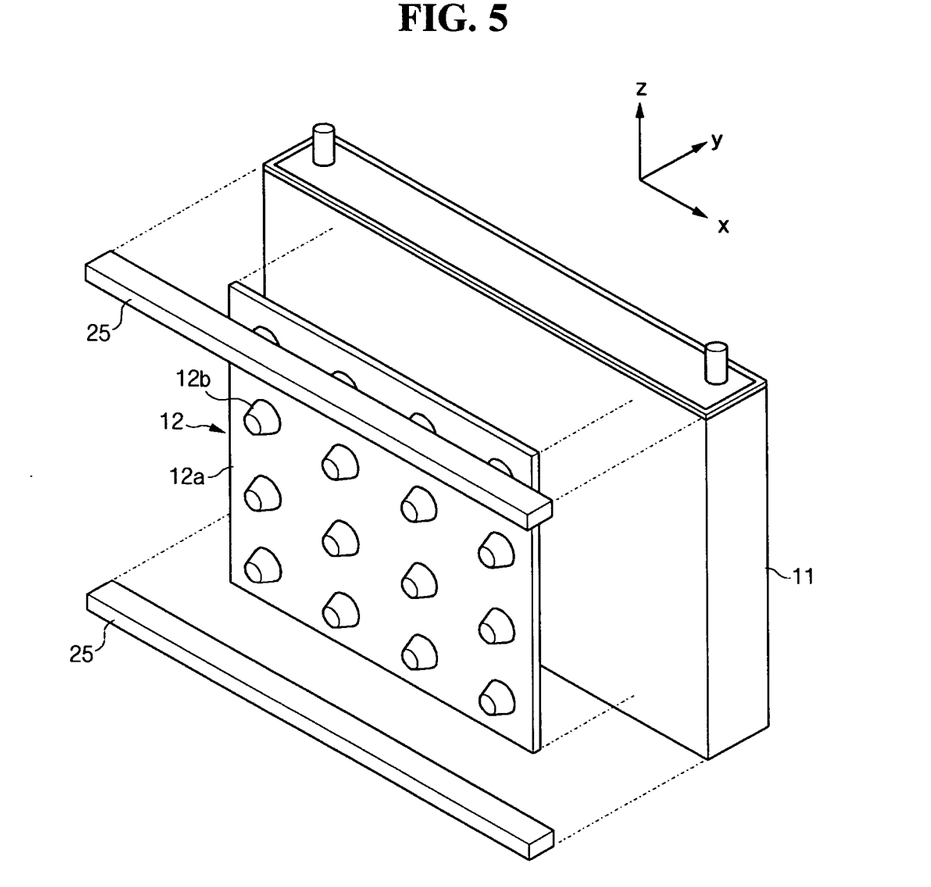
FIG. 5 illustrates an exploded perspective view of a partitioning wall, two fixing member, and a unit battery of the battery module illustrated in FIG. 3.
Figure 6:
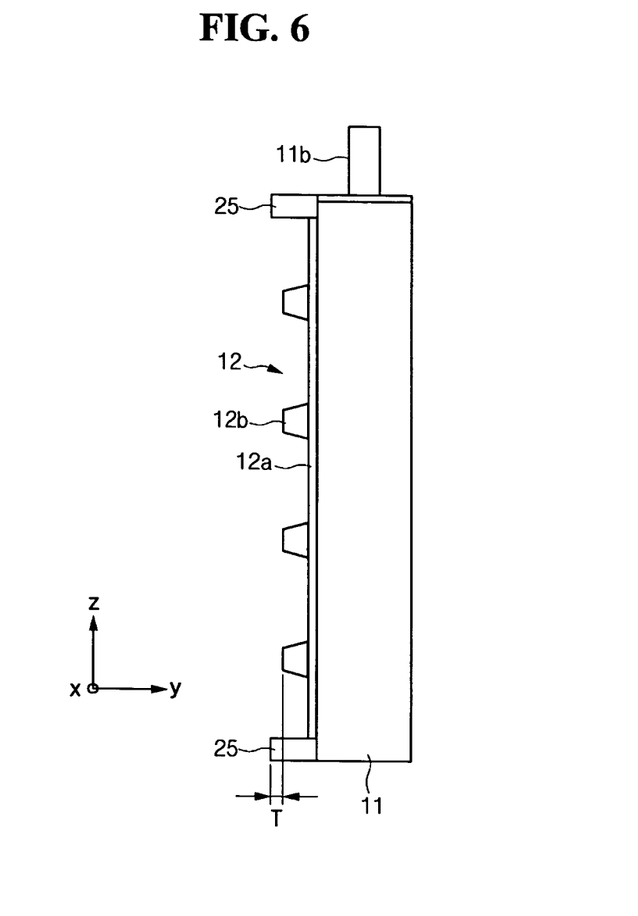
FIG. 6 illustrates a side view of an assembled partitioning wall, two fixing member, and a unit battery illustrated in FIG. 5.

The fixing members 25 may be formed of an elastic material, such as silicon or rubber. Preferably, the fixing members 25 may be formed of a silicon material having an excellent thermal conductivity. As illustrated in FIGS. 5-6, the fixing members 25 may be formed to have a width that is larger than the width of the protrusions 12b, wherein both widths may be measured from an outer surface of the battery casing 11a along the y-axis, as illustrated in FIG. 6. In particular, the difference between the widths of the fixing members 25 and the protrusions 12b may be referred to as T, wherein T may be determined by one of ordinary skill in the art with respect to the size of the unit battery 11 and the structure of the battery module 200.

Without intending to be bound by theory, it is believed that the structure of the fixing members 25, i.e., material and width, may facilitate compression thereof upon application of force. In other words, when the end plates 36 exert force to compress the plurality of unit batteries 11 and partitioning walls 12 therebetween, the fixing members 25 may contract to have a smaller width. When the fixing members 25 are contracted to have a width that is equal to the width of the protrusions 12b, the force exerted by the end plates 36 may be directed towards the partitioning walls 12 in order to inwardly compress the unit batteries 11.

In this respect, it should be noted that the initial force exerted by the end plates 36 onto the fixing members 25 may be redirected and uniformly applied to the unit batteries 11 through the partitioning walls 12. Compression of the unit batteries 11 by the partitioning walls 12 may reduce the thickness of the electrode groups 43 in the unit batteries 11 and, thereby, minimize the shifting distance of the activation material ions contained therein, i.e., improve charging/discharging efficiency.

Figure 4:
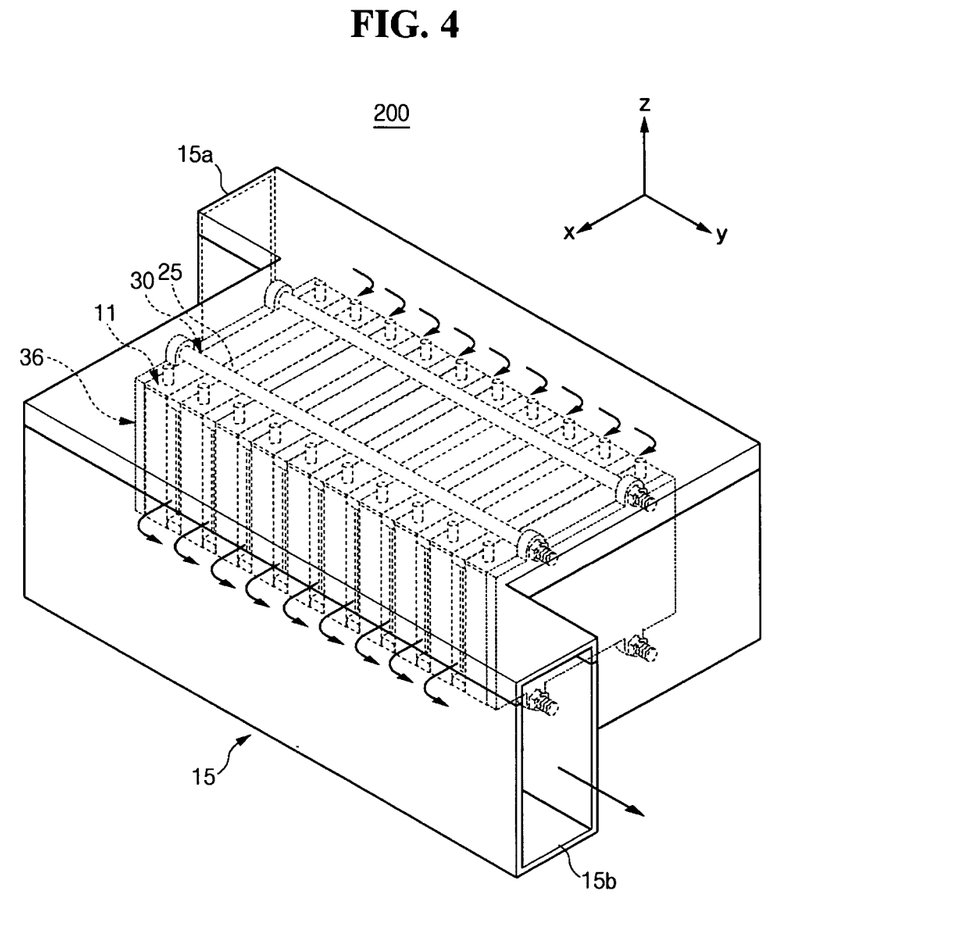
FIG. 4 illustrates an exploded perspective view of a housing containing the battery module illustrated in FIG. 3.

The battery module 200 according to an embodiment of the present invention may also include a housing 15, as illustrated in FIG. 4. The housing 15 may be formed in any suitable hollow volumetric shape known in the art, e.g., cylindrical, spherical, hexagonal, and so forth, to provide sufficient storage space for the battery module 200. Additionally, the housing 15 may include an inlet 15a and an outlet 15b for providing an inlet and an outlet, respectively, for the cooling fluid.

In particular, the cooling fluid according to an embodiment of the present invention may be introduced into the housing 15 through the inlet 15a, flow through the partitioning walls 12 along the x-axis, as illustrated in FIG. 4, and exit the housing 15 through the outlet 15b. Since the cooling fluid may flow along the x-axis, its direction may be parallel to the direction of the fixing members 25, as further illustrated in FIG. 4, thereby minimizing any interference between the cooling fluid and any of the battery module 200 elements.

Figure 7:
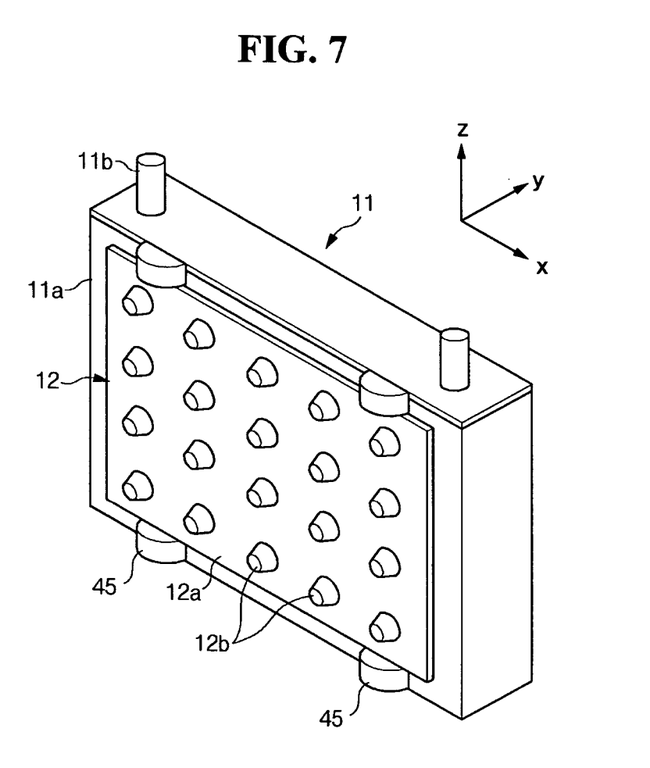
FIG. 7 illustrates a perspective view of an assembled partitioning wall, unit battery, and fixing members according to another embodiment of the present invention.

In another embodiment of a battery module according to the present invention, as illustrated in FIG. 7, a battery module may include a plurality of unit batteries 11, a plurality of partitioning walls 12 with protrusions 12b, end plates 36 for supporting the unit batteries 11, and a plurality of fixing members 45.

It is noted that some of the particular elements included in the embodiment illustrated in FIG. 7 are the same elements described previously with respect to FIGS. 1-6. Accordingly, only elements and details that may be distinguishable from the previous embodiment will be described hereinafter. Details and descriptions that may be found in both embodiments illustrated in FIGS. 1-7 will not be repeated herein.

The fixing members 45 according to an embodiment of the present invention may be formed as a plurality of semicircles, i.e., a cross-section cut away around the z-axis, such that at least two fixing members 45 may be installed in each of the upper and lower ends of the unit battery 11, as illustrated in FIG. 7. In particular, the plane of the semicircular fixing members 45, i.e., xy-plane, may be perpendicular to the plane of the partitioning wall 12, i.e., xz-plane. Accordingly, each partitioning wall 12 may be positioned between two rows of fixing members 45, each row including a plurality of fixing members 45, as further illustrated in FIG. 7

More specifically, the linear portions of the semicircles may be in contact with the unit battery 11, while the circular portion of the semicircles may protrude away from the unit battery 11 in the same direction as the protrusions 12b. The fixing members 45 may protrude outwardly further than the partitioning wall 12. In other words, the radius of the semicircle of each fixing member 45 may be longer than the width of the protrusions 12b. The fixing members 45 may be formed of an elastic material, e.g., silicon, rubber, and so forth.

Without intending to be bound by theory, it is believed that the structure of the fixing members 45, i.e., material and circular shape, may facilitate compression thereof upon application of force. In other words, exertion of force by the end plates 36 to compress the plurality of unit batteries 11 and partitioning walls 12 therebetween may contract the fixing members 45. It should be noted that the circular shape of the fixing members 45 may have a relatively smaller cross-section as compared to longitudinal shapes, e.g., rectangular bar, thereby requiring smaller force and shorter time to achieve a desirable level of compression.

Figure 8:
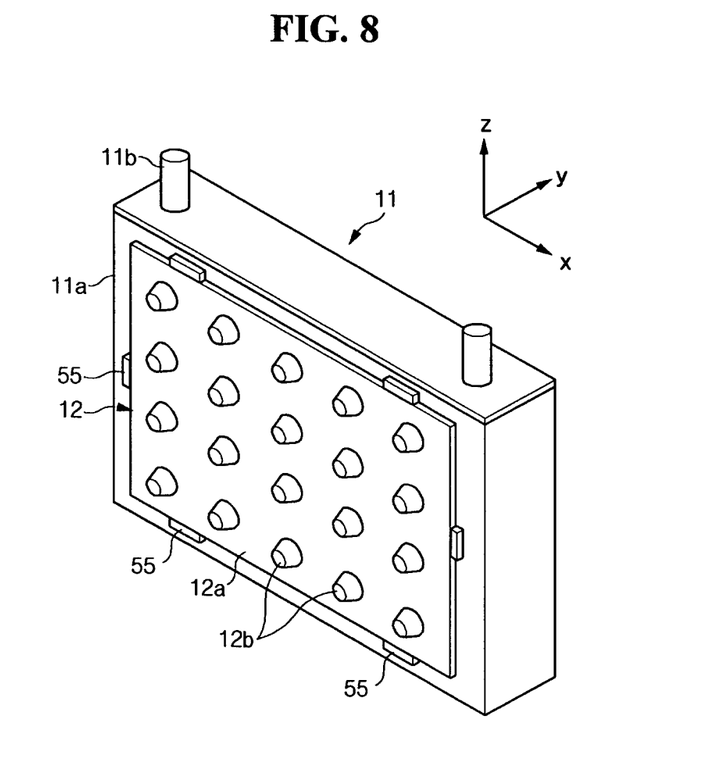
FIG. 8 illustrates a perspective view of an assembled partitioning wall, unit battery, and fixing members according to another embodiment of the present invention.

In another embodiment of a battery module according to the present invention, as illustrated in FIG. 8, a battery module may include a plurality of unit batteries 11, a plurality of partitioning walls 12, end plates 36 for supporting the unit batteries 11, and a plurality of fixing members 55.

It is noted that some of the particular elements included in the embodiment illustrated in FIG. 8 are the same elements described previously with respect to FIGS. 1-6. Accordingly, only elements and details that may be distinguishable from the previous embodiment will be described hereinafter. Details and descriptions that may be found in both embodiments illustrated in FIGS. 1-8 will not be repeated herein.

The fixing members 55 according to an embodiment of the present invention may be formed as a plurality of rectangular protrusions extending in the same direction as the protrusions 12b, such that at least four fixing members 55 may be attached to the unit battery 11, as illustrated in FIG. 8.

In particular, the fixing members 55 may be attached to a surface of the unit battery 11, such that at least one fixing member 55 may be positioned along one side of the partitioning wall 12 coupled thereto. Accordingly, each partitioning wall 12 may be surrounded by at least four fixing members 55, i.e., one on each side, as illustrated in FIG. 8.

The fixing members 55 may be either integrated with the battery casing 11a into a single structure or separately attached to the battery casing 11a. The fixing members 55 may have a width that is shorted than the width of the protrusions 12b as measured along the y-axis.

Without intending to be bound by theory, it is believed that the structure of the fixing members 55, i.e., width, may facilitate support of the partitioning wall 12 without interfering with a direction of flow of the cooling fluid.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
   a plurality of unit batteries, each unit battery having an electrode group and a battery casing;
   a plurality of partitioning walls, each partitioning wall coupled to a respective unit battery and including a plurality of protrusions protruding in a first direction normal to a largest surface of the partitioning wall, the plurality of unit batteries and partitioning walls being arranged in an alternating array, wherein each partitioning wall has a smaller size as compared to the respective unit battery, at least a length of the partitioning wall being smaller than a length of the unit battery, the lengths of the partitioning wall and unit battery being measured along a second direction perpendicular to the first direction; and
   at least one fixing member coupled to each battery unit and to a corresponding partitioning wall, a first surface of the fixing member contacting the battery unit and a second surface of the fixing member contacting the partitioning wall, the first and second surfaces of the fixing member being in different planes,
   wherein the at least one fixing member has a width that is larger than a width of the protrusions of the partitioning wall and extends beyond the protrusions of the partitioning wall along the first direction, the widths of the fixing member and protrusions being measured along the first direction.

2. The battery module as claimed in claim 1, wherein the size of the at least one partitioning wall is equal to a size of the electrode group of the at least one unit battery, the size of each of the partitioning wall and the electrode group being determined as a product of a respective length of each of the partitioning wall and the electrode group and a corresponding height measured along a third direction perpendicular to the first and second directions.

3. The battery module as claimed in claim 1, wherein a center of the at least one partitioning wall is attached to a center of the battery casing of the at least one unit battery.

4. The battery module as claimed in claim 1, wherein each partitioning wall is positioned between at least two fixing members.

5. The battery module as claimed in claim 1, wherein the at least one fixing member is formed of an elastic material.

6. The battery module as claimed in claim 1, wherein the at least one fixing member is positioned in a direction parallel to a direction of flow of a cooling fluid, the cooling fluid flowing through the partitioning wall in a direction parallel to a line connecting two electrode terminals within a same unit battery.

7. The battery module as claimed in claim 1, wherein the at least one fixing member has a semicircular shape.

8. The battery module as claimed in claim 1, wherein the at least one fixing member has a longitudinal shape.

9. The battery module as claimed in claim 1, wherein the partitioning wall and the casing of the unit battery are discrete elements, the partitioning wall being external to the casing of the unit battery.

10. The battery module as claimed in claim 1, wherein a height of the partitioning wall is smaller than a height of the unit battery, the heights of the partitioning wall and unit battery being measured along a third direction perpendicular to the first and second directions.

11. The battery module as claimed in claim 1, wherein the partitioning wall is centered along the second direction with respect to the unit battery, edges of the partitioning wall being spaced part from edges of the casing of the unit battery along the second direction.

12. The battery module as claimed in claim 1, wherein each partitioning wall includes a plurality of protrusions facing away from a corresponding unit battery coupled to the partitioning wall via the fixing member.

13. The battery module as claimed in claim 1, wherein the fixing member is arranged along at least a portion of a perimeter of the partitioning wall to contact only peripheral portions of the unit battery.

14. The battery module as claimed in claim 1, further comprising a plurality of fixing members on the battery casing, each fixing member being completely spaced apart and separated from an adjacent fixing member.

15. The battery module as claimed in claim 1, wherein the at least one fixing member is a linear bar extending along the second direction, the linear bar overlapping a majority of the length of the battery casing along the second direction.

16. The battery module as claimed in claim 1, wherein the plurality of protrusions on each partitioning wall extends along the first direction from the partitioning wall toward a battery casing of an adjacent unit battery, each protrusion including an edge facing the adjacent unit battery, a space being defined along the first direction between the edge of each protrusion to the adjacent unit battery.

17. The battery module as claimed in claim 16, wherein the at least one fixing member directly contacts the adjacent unit battery and overlaps the defined space.

18. The battery module as claimed in claim 17, wherein the plurality of unit batteries and partitioning walls are arranged between two end plates, the at least one fixing member being configured to compress to the width of the protrusions along the first direction when the two end plates are pushed toward each other.

* * * * *